(12) United States Patent
Howard et al.

(10) Patent No.: US 7,221,124 B2
(45) Date of Patent: *May 22, 2007

(54) BATTERY CHARGER WITH PROTECTION CIRCUITRY

(75) Inventors: Geoffrey S. Howard, Columbia, MD (US); Nathanael A. Mackley, Glen Rock, PA (US); Vickie J. Mead, Suzhou (CN); Brian C. Sterling, Sykesville, MD (US); Danh T. Trinh, Towson, MD (US); Robert A. Usselman, Forest Hill, MD (US); Fred S. Watts, New Freedom, PA (US); Janelle Young, Philadelphia, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/294,062

(22) Filed: Dec. 5, 2005

(65) Prior Publication Data

US 2006/0071642 A1    Apr. 6, 2006

Related U.S. Application Data

(63) Continuation of application No. 11/030,835, filed on Jan. 7, 2005, now Pat. No. 7,112,942, which is a continuation of application No. 10/388,137, filed on Mar. 13, 2003, now Pat. No. 6,859,013.

(60) Provisional application No. 60/377,184, filed on May 1, 2002, provisional application No. 60/369,769, filed on Apr. 3, 2002.

(51) Int. Cl.
*H02J 7/00*    (2006.01)

(52) U.S. Cl. ...................................................... 320/106

(58) Field of Classification Search ................ 320/106, 320/139, 127, 134, 136
See application file for complete search history.

(56) References Cited

U.S. PATENT DOCUMENTS

| | | | | |
|---|---|---|---|---|
| 5,150,031 A | * | 9/1992 | James et al. | 320/164 |
| 5,351,283 A | * | 9/1994 | Kunitomo | 455/573 |
| 5,613,229 A | * | 3/1997 | Baranowski et al. | 455/127.1 |
| 5,640,079 A | * | 6/1997 | Nelson et al. | 320/153 |
| 6,215,282 B1 | * | 4/2001 | Richards et al. | 320/160 |
| 6,252,380 B1 | * | 6/2001 | Koenck | 320/150 |
| 6,271,643 B1 | * | 8/2001 | Becker et al. | 320/112 |
| 6,307,349 B1 | * | 10/2001 | Koenck et al. | 320/112 |
| 6,859,013 B2 | * | 2/2005 | Howard et al. | 320/139 |
| 2005/0200334 A1 | * | 9/2005 | Howard et al. | 320/137 |

* cited by examiner

*Primary Examiner*—Pia Tibbits
(74) *Attorney, Agent, or Firm*—Adan Ayala

(57) ABSTRACT

The charger includes a controller, a battery power source having at least two power settings connected to the controller, a power supply connectable to an outside power source, the power supply receiving a current and voltage from the outside power source for providing power to at least one of the controller and the battery power source, and a foldback circuit for switching between two power settings depending upon at least one of the current and voltage received from the outside power source.

5 Claims, 8 Drawing Sheets

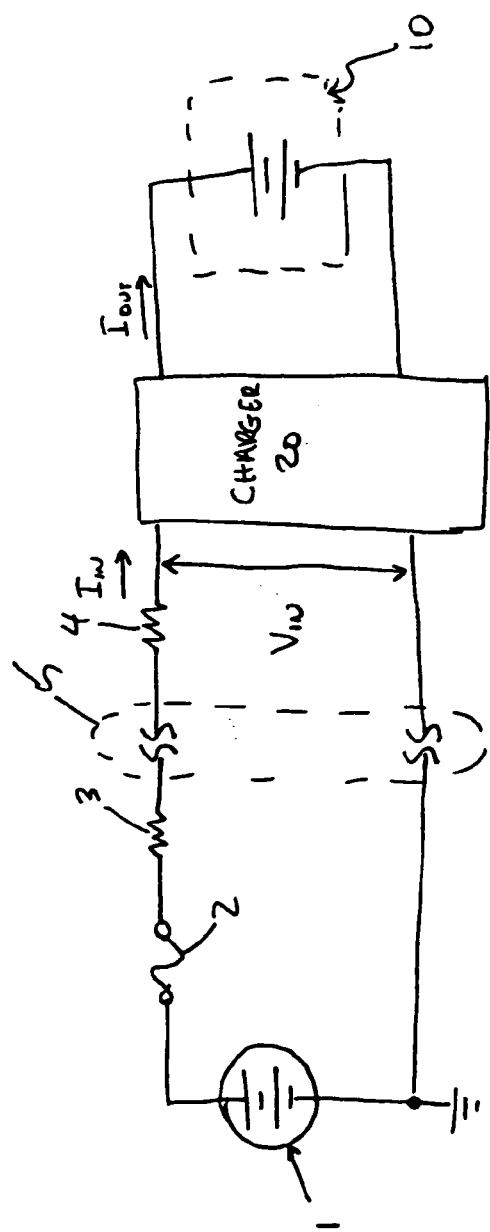

BATTERY CHARGER WITH PROTECTION CIRCUITRY

The following application is a continuation of U.S. application Ser. No. 11/030,835, filed Jan. 7, 2005, now U.S. Pat. No. 7,112,942, which in turn is a continuation of U.S. application Ser. No. 10/388,137, filed Mar. 13, 2003, now U.S. Pat. No. 6,859,013, which in turn derives priority from U.S. application Ser. No. 60/369,769, filed Apr. 3, 2002, and U.S. application Ser. No. 60/377,184, filed on May 1, 2002.

FIELD OF THE INVENTION

This invention relates generally to battery chargers and more particularly to battery chargers with protection circuitry.

BACKGROUND OF THE INVENTION

The battery packs for portable power tools, outdoor tools and certain kitchen and domestic appliances may include rechargeable batteries, such as lithium, nickel cadmium, nickel metal hydride and lead-acid batteries, so that they can be recharged rather than be replaced. Thereby a substantial cost saving is achieved.

Some chargers can be connected to a vehicle battery, such as a car battery. Referring to FIG. 1, car battery 1 can-be connected to charger 20 via a lighter plug 5. Charger 20 in turn charges battery pack 10.

Two virtual resistors 3, 4 may exist between car battery 1 and charger 20. Virtual resistors 3, 4 represent the inherent resistance before and after the lighter plug connection, which in turn create voltage drops. Accordingly, the voltage $V_{IN}$ received by the charger 20 may not necessarily be equal to the voltage of car battery 1.

A fuse 2 may also be provided between car battery 1 and charger 20. Typically, such fuse 2 has a rating of about 8 amps. In other words, if the current $I_{IN}$ going to charger 20 is larger than about 8 amps, the fuse 2 will open.

This could be problematic as charger 20 typically sends an effective constant current $I_{OUT}$ to battery pack 10. Such problem arises because of the following equation:

$$(V_{IN})(I_{IN})k = (V_{PACK})(I_{OUT}),$$

where $V_{IN}$, $I_{IN}$, and $I_{OUT}$ are defined above,
k is the charger efficiency constant, and
$V_{PACK}$ is the voltage of battery pack 10.

Under such equation, since $V_{PACK}$ is set by the battery pack, and $I_{OUT}$ as set by the charger and the charger efficiency constant k are relatively constant, the only two variables remaining are $V_{IN}$ and $I_{IN}$. If $V_{IN}$ drops below a certain threshold, $I_{IN}$ will have to increase to maintain the equation. However, if $I_{IN}$ increases beyond a certain threshold, it will force fuse 2 to open, thus prematurely ending charging.

SUMMARY OF THE INVENTION

In accordance with the present invention, an improved battery pack charger is employed. The charger includes a controller, a battery power source having at least two power settings connected to the controller, at least one terminal connected to at least one of the controller and the battery power source, a power supply connectable to an outside power source, the power supply receiving a current and voltage from the outside power source for providing power to at least one of the controller and the battery power source, and a foldback circuit for switching between two power settings depending upon at least one of the current and voltage received from the outside power source.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 1 is a simplified block diagram of a battery pack and charger;

FIG. 2 illustrates an exemplary charger according to the present invention, where

DETAILED DESCRIPTION

The invention is now described with reference to the accompanying figures, wherein like numerals designate like parts.

Figure 2A:
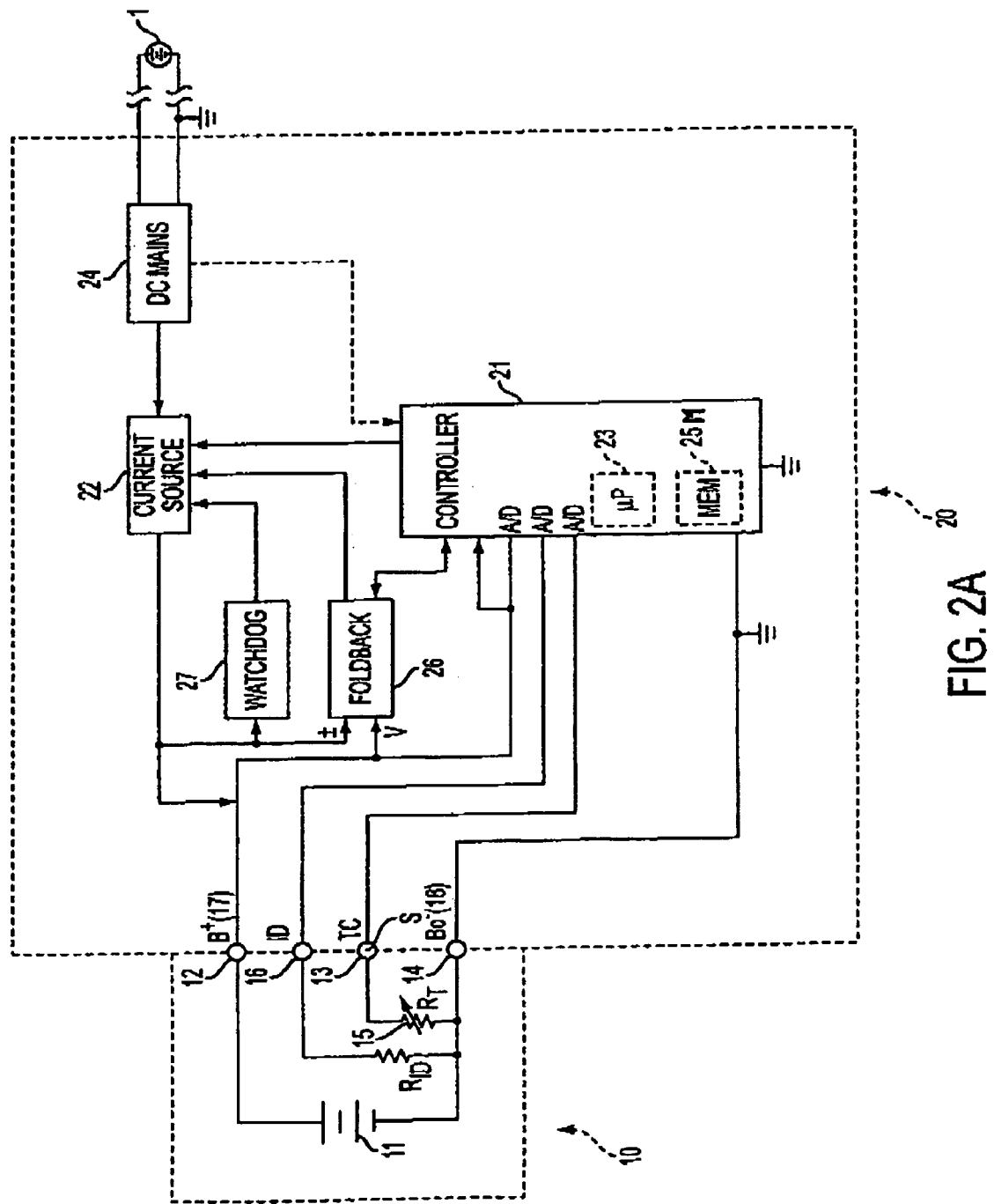
FIG. 2A is a block diagram of a battery pack and the charger.

Referring to FIGS. 1–2, a battery pack 10 is connected to a charger 20. Battery pack 10 may comprise a plurality of battery cells 11 connected in series and/or parallel, which dictate the voltage and storage capacity for battery pack 10. Battery pack 10 may include three battery contacts: first battery contact 12, second battery contact 13, third battery contact 14 and fourth battery contact 16. Battery contact 12 is the B+ (positive) terminal for battery pack 10. Battery contact 14 is the B− or negative/common terminal. Battery contact 13 is the S or sensing terminal. Battery contacts 12 and 14 receive the charging current sent from the charger 20 (preferably from current source 22, as discussed below) for charging the battery pack 10.

As shown in FIG. 2, the battery cells 11 are connected between the battery contacts 12 and 14. In addition, preferably connected between battery contacts 13 and 14 is a temperature sensing device 15, such as a negative temperature co-efficient (NTC) resistor, or thermistor, $R_T$. The temperature sensing device is preferably in closer proximity to the cells 11 for monitoring of the battery temperature. Persons skilled in the art will recognize that other components, such as capacitors, etc., or circuits can be used to provide a signal representative of the battery temperature.

Battery pack 10 may also comprise an identifier as known in the prior art, such as resistor $R_{ID}$, so that charger 20 can identify the type and capacity of the battery pack, and charge accordingly. Resistor $R_{ID}$ is preferably connected between battery contacts 16 and 14, where battery contact 16 is the ID terminal.

The charger 20 preferably comprises a controller 21, which in turn includes positive terminal (B+) 17 and negative (B−) terminal 18, which are coupled to battery pack 10 via battery contacts 12 and 14, respectively. The positive terminal may also act as an input, preferably an analog/digital input, in order for the controller 21 to detect the battery pack voltage. In addition, the controller 21 may include another input TC, preferably an analog/digital input, which is coupled to the temperature sensing device 15 via the third battery contact 13 (S). This allows the controller 21 to monitor the battery temperature.

Controller 21 may include a microprocessor 23 for controlling the charging and monitoring operations. Controller 21 may control a charging power source for providing power to the battery pack 10, such as current source 22 that provides current to battery pack 10. This current may be a fast charging current and/or an equalization current. Current source 22 may be integrated within controller 21.

Controller 21 may have a memory 25M for storing data. Memory 25M may be integrated within controller 21 and/or microprocessor 23.

The charger 20, and its elements within, including controller 21, microprocessor 23, and current source 22, receive the necessary power from a DC mains power supply 24, which may be ultimately connected to car battery 1. DC mains power supply 24 may convert the power received from the vehicle battery to the necessary power requirements of the different elements, as is well known in the art. DC mains power supply 24 may include a filter, which in turn may include capacitors C1, C2, C3, C36, and C34 and inductors L1, L2, L3 to filter out unwanted fluctuations in the input voltage.

Controller 21 may also control a fan 25. Fan 25 preferably blows air towards the battery pack 10 for cooling the battery pack 10.

In order to avoid opening fuse 2 because of a high $I_{IN}$, it is preferable to provide a foldback circuit 26 that monitors several inputs, and lowers the current output $I_{OUT}$ of current source 22. Foldback circuit 26 may monitor the current output $I_{OUT}$, as well as the battery pack voltage $V_{PACK}$. In addition, foldback circuit 26 may receive information from controller 26 and/or DC mains power supply 24 concerning input voltage $V_{IN}$. If foldback circuit 26 determines that, based on those inputs, the input current $I_{IN}$ will exceed a certain threshold, such as 8 amps, foldback circuit 26 will send a signal to current source 22, lowering current output $I_{OUT}$. By lowering current output $I_{OUT}$, input current $I_{IN}$ is also lowered, thus preventing opening fuse 2.

Figure 2B:
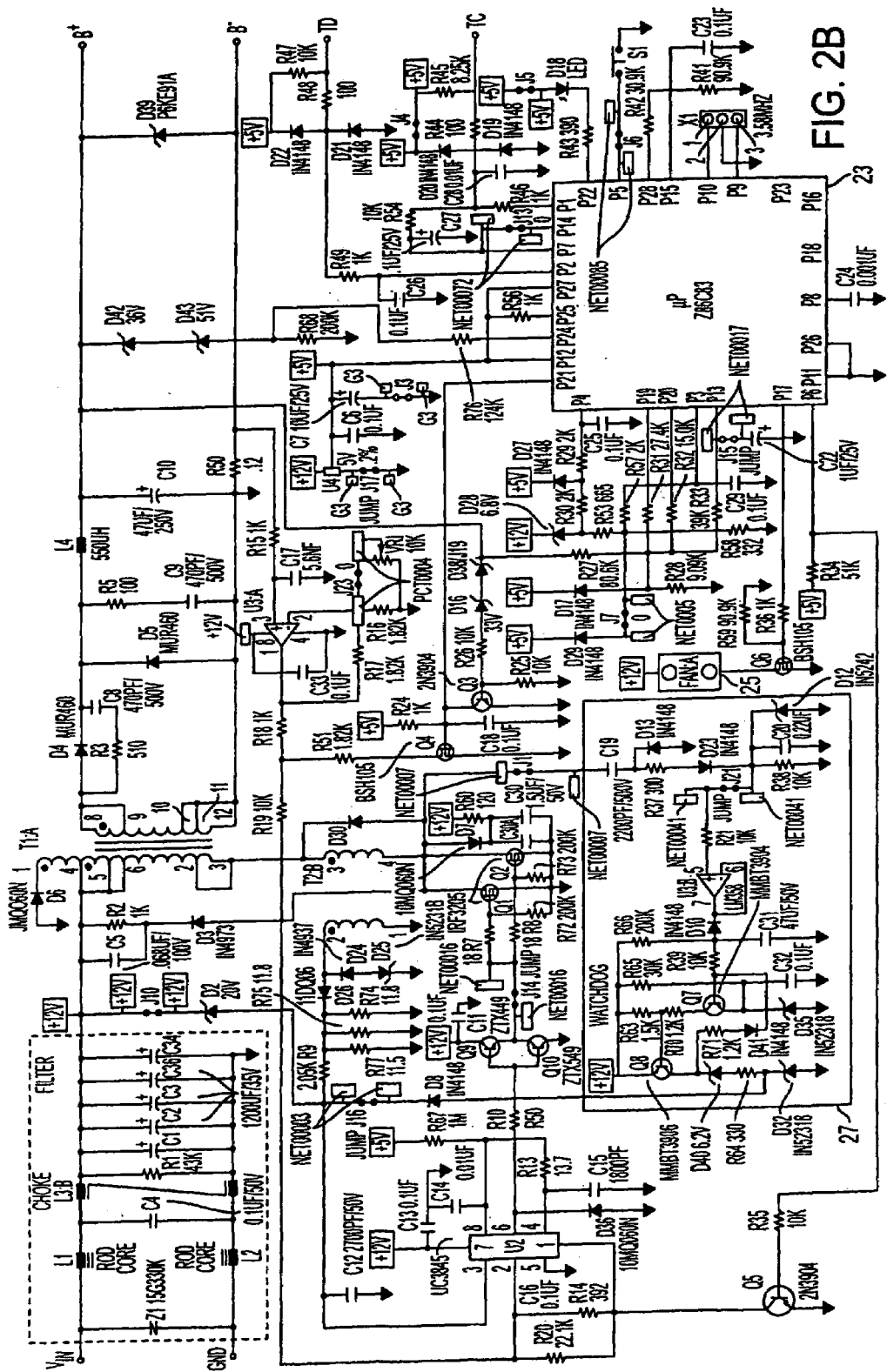
FIG. 2B is a schematic diagram of the charger.

Referring to FIG. 2B, foldback circuit 26 preferably works in the following manner. The connection from output B+ to diode D38 is preferably used to detect a voltage level set by diodes D38 and/or D16. When this voltage level is exceeded, transistor Q3 is preferably switched on. Transistor Q3, when in the on state, preferably ensures that transistor Q4 is in the off state by pulling the gate down to the source. Transistor Q4 is preferably used a switch to change the gain of the current sense amplifier U3:A.

Persons skilled in the art will note that pin P21 of microprocessor 23 will sense the state of the amplifier U3:A by measuring the voltage. Microprocessor 23 can also detect the output voltage $V_{OUT}$ via pin P13 and the input voltage $V_{IN}$ can be detected via pin P4.

Pin P21 of microprocessor 23 is preferably normally left in a high impedance state and preferably used as an input to detect the function of transistor Q3. When the microprocessor 23 needs to force the output current $I_{OUT}$ low, it will preferably make pin P21 an output and put it in the low state, thus removing the gate drive from transistor Q4 and changing the gain of the current feedback amp U3:A. Such circuit is advantageous as it minimizes the number of components, as well as controls any unwanted oscillations.

Figure 3A:
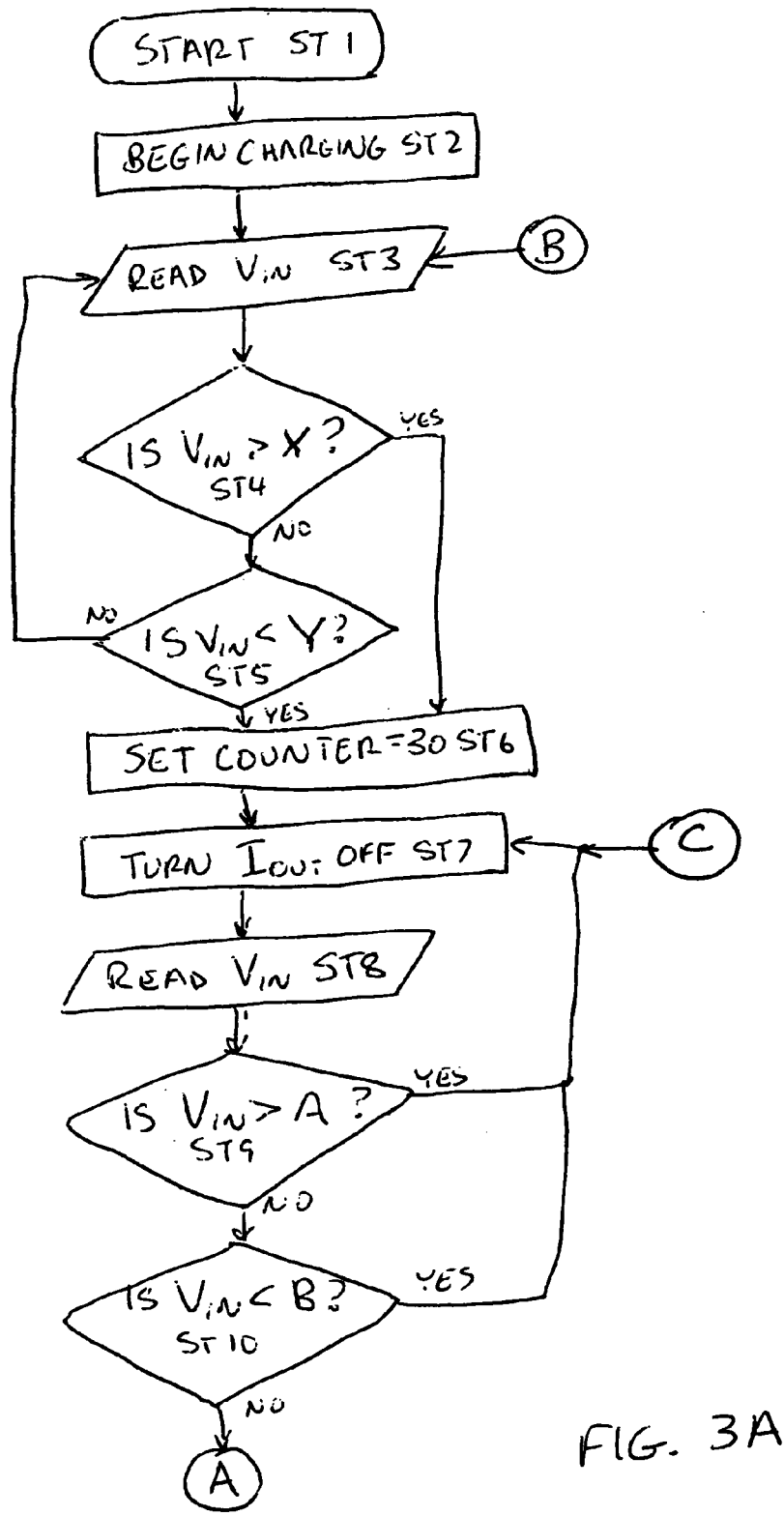
FIG. 3 is a flowchart showing a method according to the present invention.
Figure 3B:
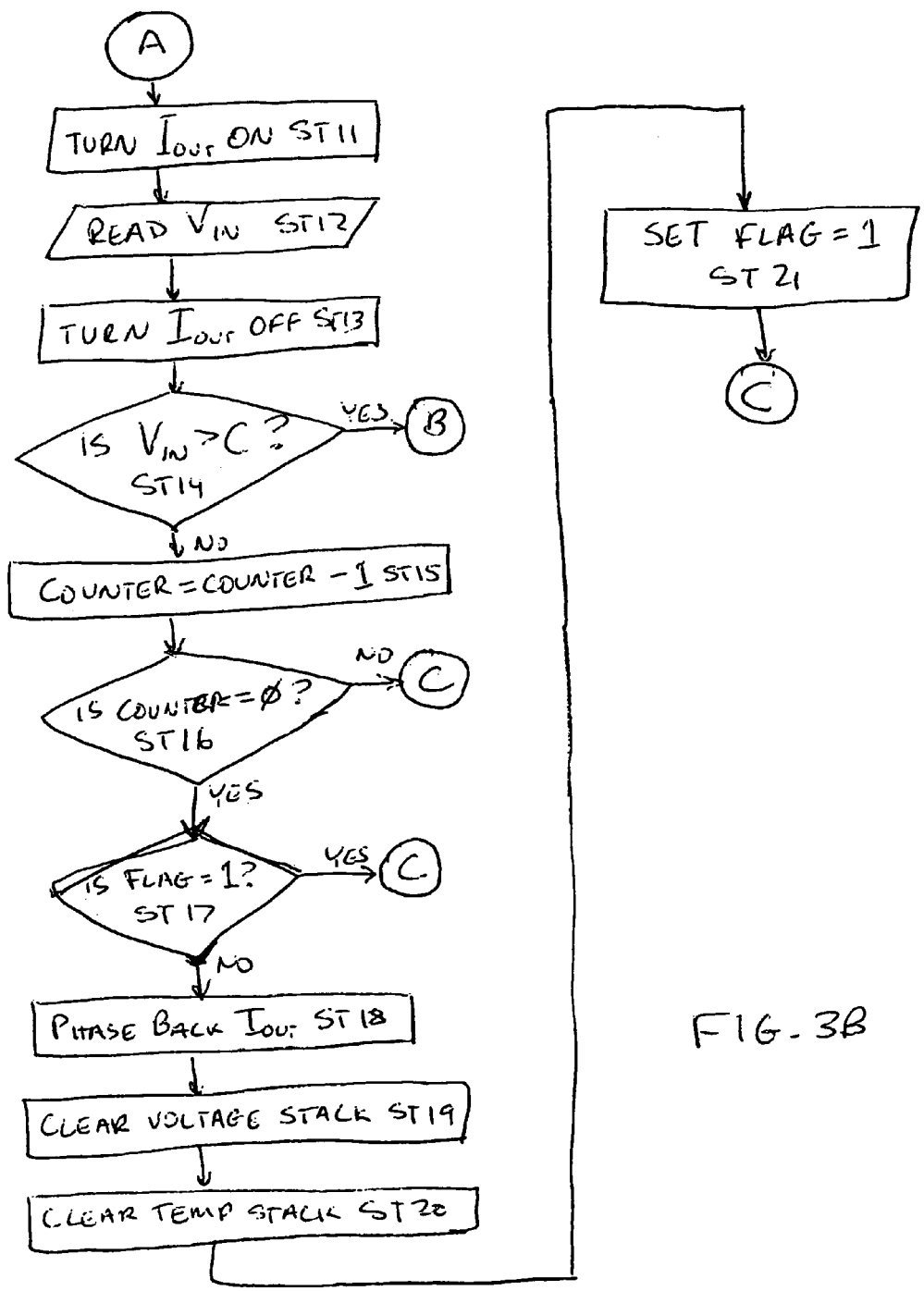

Persons skilled in the art will recognize that foldback circuit 26 can be implemented with a circuit, as shown in FIG. 2B, or via a software algorithm, as shown in FIG. 3. Persons skilled in the art will recognize that the order of the steps discussed below may be altered.

The charging process begins upon insertion of battery pack 10 into charger 20 by the user (ST1). The charger 20 then begins charging (ST2) by sending a charge current sent from current source 22 to battery pack 10. Preferably, the fast charge current is about 2 Amps.

The controller 21 and/or microprocessor 23 reads input voltage $V_{IN}$ (ST3). The controller 21 and/or microprocessor 23 then preferably checks whether input voltage $V_{IN}$ is greater than a first threshold X (ST4). Preferably, first threshold X represents a high vehicle battery voltage, which may be about 17 volts for a vehicle battery rated for 12 volts.

If input voltage $V_{IN}$ is not greater than a first threshold X, then controller 21 and/or microprocessor 23 then preferably checks whether input voltage $V_{IN}$ is smaller than a second threshold Y (ST5). Preferably, second threshold Y represents a low vehicle battery voltage, which may be about 10 volts for a vehicle battery rated for 12 volts.

If (a) input voltage $V_{IN}$ is not greater than a first threshold X and (b) input voltage $V_{IN}$ is not smaller than a second threshold Y, charging of battery pack 10 continues until the charging process is terminated by removal of the battery pack 10, or by a termination algorithm, etc. The controller 21 and/or microprocessor 23 nevertheless keep reading input voltage $V_{IN}$ and comparing input voltage $V_{IN}$ to first and second thresholds X,Y until termination.

If (a) input voltage $V_{IN}$ is greater than a first threshold X or (b) input voltage $V_{IN}$ is smaller than a second threshold Y, an error subroutine may begin. It is preferable to set a counter to a certain predetermined number (ST6), such as thirty. In addition, it is preferable to turn off current source 22 (and thus the output current $I_{OUT}$) (ST7). A error signal may also be displayed via an LCD display or LEDs. A sound source, such as a piezoelectric element, a beeper, etc., may also be used to alert the user to the error condition.

The controller 21 and/or microprocessor 23 may again read input voltage $V_{IN}$ (ST8). The controller 21 and/or microprocessor 23 then preferably checks whether input voltage $V_{IN}$ is greater than a third threshold A (ST9). Preferably, third threshold A represents a value lower than the first threshold X in order to prevent charger 20 from oscillating between states in the flowchart. Accordingly, third threshold A may be about 16.8 volts for a vehicle battery rated for 12 volts. If the input voltage $V_{IN}$ is larger than third threshold A, then the charger 20 returns to ST7 and/or ST8 until the input voltage $V_{IN}$ is equal to or smaller than third threshold A, or battery pack 10 is removed.

If input voltage $V_{IN}$ is not greater than a third threshold A, then controller 21 and/or microprocessor 23 then preferably checks whether input voltage $V_{IN}$ is smaller than a fourth threshold B (ST10). Preferably, fourth threshold B is a value higher than second threshold Y in order to prevent charger 20 from oscillating between states in the flowchart. Accordingly, fourth threshold B may be about 10.7 volts for a vehicle battery rated for 12 volts. If the input voltage $V_{IN}$ is smaller than fourth threshold B, then the charger 20 returns to ST7 and/or ST8 until the input voltage $V_{IN}$ is equal to or smaller than third threshold A, or battery pack 10 is removed.

If (a) input voltage $V_{IN}$ is not greater than a third threshold A and (b) input voltage $V_{IN}$ is not smaller than a fourth threshold B, it is preferable to turn on current source 22 (and thus the output current $I_{OUT}$) (ST11) for a limited amount of time, such as 10 milliseconds. The controller 21 and/or microprocessor 23 may again read input voltage $V_{IN}$ (ST12) to in effect check the battery pack's reaction to output current $I_{OUT}$. After such reading, it is preferable to turn off current source 22 (and thus the output current $I_{OUT}$) (ST13). Turning on and off current source 22 allows the controller 21 to check the battery pack's reaction without sending too much current, which may damage the battery pack 10.

The controller 21 and/or microprocessor 23 then preferably checks whether input voltage $V_{IN}$ is greater than a fifth threshold C (ST14). Preferably, fifth threshold C represents a value higher than fourth threshold B. Accordingly, fifth threshold C may be about 10.2 volts for a vehicle battery rated for 12 volts. If the input voltage $V_{IN}$ is larger than fifth threshold C, then the charger 20 returns to ST3, so that charging of battery pack 10 can continue. Persons skilled in the art shall recognize that, if an error signal was displayed, such signal can be ended or removed.

However, if input voltage $V_{IN}$ is not greater than a fifth threshold C, the counter can be decreased (ST15). If the counter is zero (ST16), then the charger 20 returns to ST7 and/or ST8 until the input voltage $V_{IN}$ is equal to or smaller than third threshold A, or battery pack 10 is removed.

If the counter is not zero, controller 21 and/or microprocessor 23 then preferably checks whether a phase back flag has been set (ST17). If such flag has been set, then the charger 20 returns to ST7 and/or ST8 until the input voltage $V_{IN}$ is equal to or smaller than third threshold A, or battery pack 10 is removed.

If the phaseback flag has not been set, then controller 21 and/or microprocessor 23 then preferably control current source 22 to lower, or phase back, the output current $I_{OUT}$ (ST18). Preferably, the output current $I_{OUT}$ is lowered from about 2 amps to about 1.3 amps for the rest of the charging process.

Because of the lowered output current $I_{OUT}$, it may be preferable to clear the memory stacks which contain input voltage $V_{IN}$ and/or battery pack temperature information (ST18, ST19, respectively), so as to not trigger a termination algorithm prematurely.

In addition, it is preferable to set the phaseback flag (ST21). After setting the flag, the charger 20 can then return to ST7 and/or ST8 until the input voltage $V_{IN}$ is equal to or smaller than third threshold A, or battery pack 10 is removed.

It may also be preferable for the microprocessor 23 to lower the output current $I_{ON}$ (e.g., from 2.0 amps to 1.3 amps) if the battery pack voltage $V_{PACK}$ is above a certain threshold, such as about 34 volts. Like before, this is preferably done to avoid the opening of fuse 2.

Charger 20 may also have protective circuits other than foldback circuit 26. For example, it is preferably to provide a circuit to turn off current source 22 if the output current ION is on and the battery pack 10 is removed. This could create a large voltage spike across the B+ and B− terminals, which could damage components within charger 20.

Rather than relying on the analog/digital inputs of microprocessor 23, it is preferably to use a high speed input in microprocessor 23, so that if the desired signal is received, the microprocessor 23 would turn current source 22 off. Persons skilled in the art will recognize that such high speed input is pin P24 of microprocessor 23. In addition, persons skilled in the art will recognize how the type of signal received by microprocessor 23 via pin P24 from examining FIG. 2B.

It is also preferable to provide a watchdog circuit 27 that monitors whether microprocessor 23 is in control of current source 22. In a preferred embodiment, watchdog circuit 27 monitors pulses given at a specific interval by the microprocessor 23. In the event that the microprocessor 23 fails to provide such pulses at the predetermined interval, the watchdog circuit 27 preferably bypasses the microprocessor 23 and preferably disables current source 22 and/or DC mains power supply 24. The disabled current source 22 and/or DC mains power supply 24 will preferably remain disabled until power is removed from charger 20.

The watchdog circuit 27 preferably has two resettable timers. These two timers are used to provide a margin of error before the watchdog circuit 27 disables current source 22 and/or DC mains power supply 24, to prevent nuisance or undesired tripping of the watchdog circuit 27. Typically, this margin of error is a factor of five. In other words, microprocessor 23 would have to miss five pulses before the watchdog circuit 27 disables current source 22 and/or DC mains power supply 24.

Referring to FIG. 2B, transistors Q1, Q2 are ultimately controlled by microprocessor 23 to provide pulses. When these pulses are present, a voltage is developed across capacitor C20, which in turn allows C31 to charge. Preferably, the microprocessor shuts down the current source 22 for about 33 milliseconds in every one-second period. This allows capacitor C20 to discharge through resistor R38. Since amplifier U3:B is preferably in a voltage follower configuration, capacitor C31 preferably discharges into pin 7 of amplifier U3:B.

If the microprocessor does not shut down current source 22 at the specified interval, capacitor C31 will continue to charge until the voltage reaches approximately the zener voltage $V_Z$ of diode D35. This allows current to flow through the base of transistor Q7, which starts to turn on transistor Q7. This in turn starts transistor Q8 conducting, which in turn supplies more current through diode 41 to the base of transistor Q7, making transistor Q7 to conduct more current. This feedback process continues until the circuit is latched with transistors Q7, Q8 substantially, if not fully, saturated.

When the voltage at the collector of transistor Q8 is equal to or greater than the sum of zener voltage $V_Z$ of diode D40, forward bias voltage $V_F$ of diode D8 and one volt (i.e., the shutdown voltage of integrated circuit U2), integrated circuit U2 is forced into an overcurrent condition and shuts down current source 22. The watchdog circuit 27 will thus remain latched in this state until the power is removed from charger 20.

Persons skilled in the art will recognize that the watchdog circuit 27 may have three sections: a first timer, a second timer and a latch. The first timer will include capacitor C19, which preferably couples drain pulese to form a voltage across resistor R38, capacitor C20 and diode D12. The timer is formed by the voltage decay of resistor R38 and capacitor C20 when the drain pulses are not present. Diode D13 preferably discharges capacitor C19. Resistor R37 limits the current into diode D12. Diode 23 blocks any discharge of capacitor C20 except through resistor R38. Diode D12 sets a maximum voltage on this timer circuit. Resistor R21 limits current into pin 5 of amplifier U3:B.

The second timer includes capacitor C31, resistor R66, which charges capacitor C31, diode D10, which prevents pin 7 of amplifier U3:B from charging capacitor C31, and amplifier U3:B, which discharges capacitor C31.

The latch includes resistor R39, which allows the voltage to rise at the base of transistor Q7 regardless of the potential across capacitor C31, diode D35, which sets the latch trip voltage, and capacitor C32, which filters noise across diode D35. As discussed above, the latch includes transistors Q7, Q8, which create a feedback loop, as well as resistor R70, which limits current through the base of transistor Q8, resistor R63, which sets the gain of transistor Q8, and resistor R71, which limits the current going into the base of transistor Q7. Furthermore, the latch includes resistor R65, which insures that diode D35 is at VZ, diode D41, which prevents voltage across capacitor C31 from influencing pin 3 of integrated circuit U2, diode D40, which insures a latched state before shut down, diode D32, which prevents voltage a pin 3 of integrated circuit U2 from being exceeded, and resistor R64, which limits current through diode D32. Finally, the latch includes a diode D8**, which prevents the watchdog circuit to influence the charger circuitry during normal charger operation.

Referring to FIG. 2B, the values of the different components of an exemplary charger according to the invention are as follows:

| | |
|---|---|
| C1 | 1200 microfarads/35 V |
| C2 | 1200 microfarads/35 V |
| C3 | 1200 microfarads/35 V |
| C4 | 0.1 microfarads/50 V |
| C5 | 0.068 microfarads/100 V |
| C6 | 0.1 microfarads |
| C7 | 10 microfarads/25 V |
| C8 | 470 picofarads/500 V |
| C9 | 470 picofarads/500 V |
| C10 | 47 microfarads/250 V |
| C11 | 0.1 microfarads |
| C12 | 2700 picofarads/50 V |
| C13 | 0.1 microfarads |
| C14 | 0.01 microfarads |
| C15 | 1800 picofarads |
| C16 | 0.1 microfarads |
| C17 | 5.6 nanofarads |
| C18 | 0.1 microfarads |
| C19 | 2200 picofarads/500 V |
| C20 | 0.22 microfarads |
| C22 | 1 microfarads/25 V |
| C23 | 0.1 microfarads |
| C24 | 0.001 microfarads |
| C25 | 0.1 microfarads |
| C26 | 0.1 microfarads |
| C27 | 0.1 microfarads/25 V |
| C28 | 0.01 microfarads |
| C29 | 0.1 microfarads |
| C30A | 1 microfarads/100 V |
| C31 | 47 microfarads/50 V |
| C32 | 0.1 microfarads |
| C33 | 0.1 microfarads |
| C36 | 1200 microfarads/35 V |
| D2 | 20 v Zener |
| D3 | IN4973 |
| D4 | MUR460 |
| D5 | MUR460 |
| D6 | 1OMQ060N |
| D7 | 10MQ060N |
| D8 | IN4148 |
| D10 | IN4148 |
| D12 | IN5242 |
| D13 | IN4148 |
| D16 | 33 V Zener |
| D17 | IN4148 |
| D18 | LED |
| D19 | IN4148 |
| D20 | IN4148 |
| D21 | IN4148 |
| D22 | IN4148 |
| D23 | IN4148 |
| D24 | IN4937 |
| D25 | IN5231B |
| D26 | 11DQ06 |
| D27 | IN4148 |

-continued

| | |
|---|---|
| D28 | 6.8 V Zener |
| D29 | IN4148 |
| D32 | IN5231B |
| D35 | IN5231B |
| D36 | 10MQ060N |
| D39 | P6KE91A |
| D40 | 6.2 V Zener |
| D41 | 1N4148 |
| D42 | 36 V Zener |
| D43 | 51 V Zener |
| L1 | Rod Core |
| L2 | Rod Core |
| L3: B | Choke |
| L4 | 550 microhenries |
| Q1 | IRF3205 |
| Q2 | IRF3205 |
| Q3 | 2N3904 |
| Q4 | BSH105 |
| Q5 | 2N3904 |
| Q6 | BSH105 |
| Q7 | MMBT3904 |
| Q8 | MMBT3906 |
| Q9 | ZTX449 |
| Q10 | ZTX549 |
| R1 | 43 kiloohms |
| R2 | 1 kiloohms |
| R3 | 510 ohms |
| R5 | 100 ohms |
| R7 | 18 ohms |
| R8 | 18 ohms |
| R9 | 2.05 kiloohms |
| R10 | 150 ohms |
| R13 | 13.7 kiloohms |
| R14 | 392 ohms |
| R15 | 1 kiloohms |
| R16 | 1.82 kiloohms |
| R17 | 1.82 kiloohms |
| R18 | 1 kiloohms |
| R19 | 10 kiloohms |
| R20 | 22.1 kiloohms |
| R21 | 10 kiloohms |
| R24 | 1 kiloohms |
| R25 | 10 kiloohms |
| R26 | 10 kiloohms |
| R27 | 80.6 kiloohms |
| R28 | 9.09 kiloohms |
| R29 | 2 kiloohms |
| R30 | 2 kiloohms |
| R31 | 27.4 kiloohms |
| R32 | 15.0 kiloohms |
| R33 | 39 kiloohms |
| R34 | 51 kiloohms |
| R35 | 10 kiloohms |
| R36 | 1 kiloohms |
| R37 | 300 ohms |
| R38 | 10 kiloohms |
| R39 | 10 kiloohms |
| R41 | 90.9 kiloohms |
| R42 | 30.9 kiloohms |
| R43 | 390 ohms |
| R44 | 100 ohms |
| R45 | 8.25 kiloohms |
| R46 | 1 kiloohms |
| R47 | 10 kiloohms |
| R48 | 100 ohms |
| R49 | 1 kiloohms |
| R50 | 0.12 ohms |
| R51 | 1.82 kiloohms |
| R53 | 665 ohms |
| R54 | 10 kiloohms |
| R56 | 1 kiloohms |
| R57 | 2 kiloohms |
| R58 | 332 ohms |
| R59 | 90.9 kiloohms |
| R60 | 120 ohms |
| R63 | 1.5 kiloohms |
| R64 | 330 ohms |
| R65 | 30 kiloohms |
| R66 | 200 kiloohms |

-continued

| | |
|---|---|
| R68 | 200 kiloohms |
| R70 | 1.2 kiloohms |
| R71 | 1.2 kiloohms |
| R72 | 200 kiloohms |
| R73 | 200 kiloohms |
| R74 | 11.8 ohms |
| R75 | 11.8 ohms |
| R76 | 124 kiloohms |
| R77 | 11.5 ohms |
| Microprocessor 23 | Zilog Z86C83 |
| U2 | UC3845 |
| U3 | LM358 |
| U4 | 5 volt, 2% |
| VR1 | 10 kiloohms potentiometer |
| X1 | 3.58 megahertz |
| Z1 | 15G330K |

Figure 4:
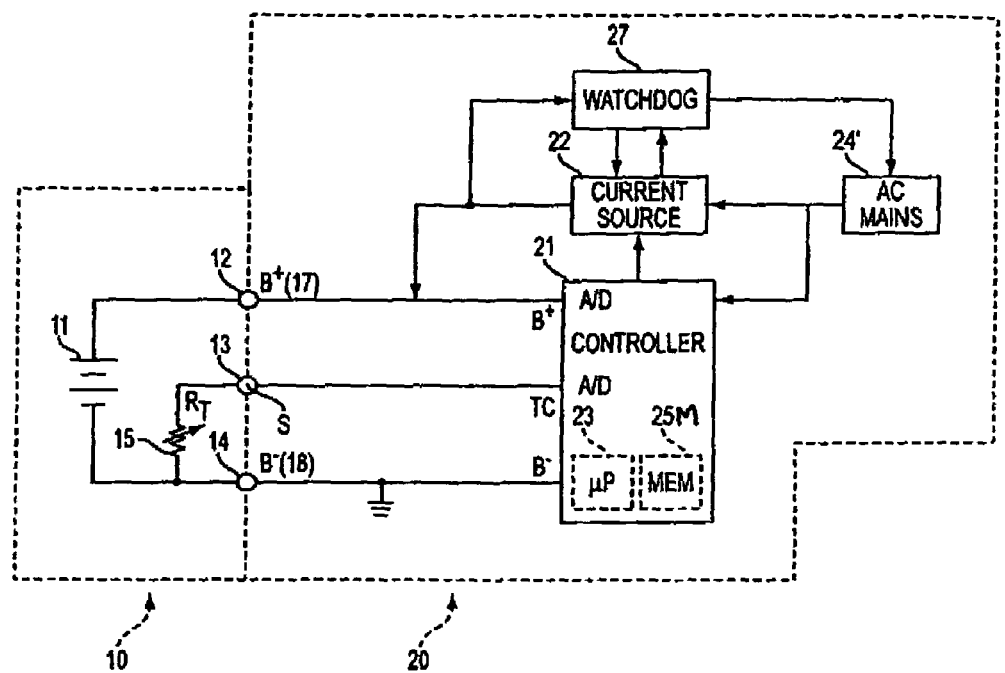
FIG. 4 is a simplified block diagram of an alternate battery pack and charger.

Referring to FIG. 4, an alternate charger and battery pack combination is shown, wherein like numerals designate like parts. One major difference between the prior charger and the present charger is that the present charger 20, and its elements within, including controller 21, microprocessor 23, and current source 22, receive the necessary power from an AC mains power supply 24', rather than DC mains power supply 24.

It is preferable to provide a watchdog circuit 27 that monitors whether controller 21 and/or microprocessor 23 are in control of current source 22, and/or that the current source 22 is responding to commands from controller 21 and/or microprocessor 23. In a preferred embodiment, watchdog circuit 27 monitors pulses given at a specific interval by the microprocessor 23. In the event that the microprocessor 23 fails to provide such pulses at the predetermined interval, the watchdog circuit 27 preferably bypasses the microprocessor 23 and preferably disables current source 22 and/or AC mains power supply 24'. The disabled current source 22 and/or AC mains power supply 24' will preferably remain disabled until power is removed from charger 20.

Figure 5:
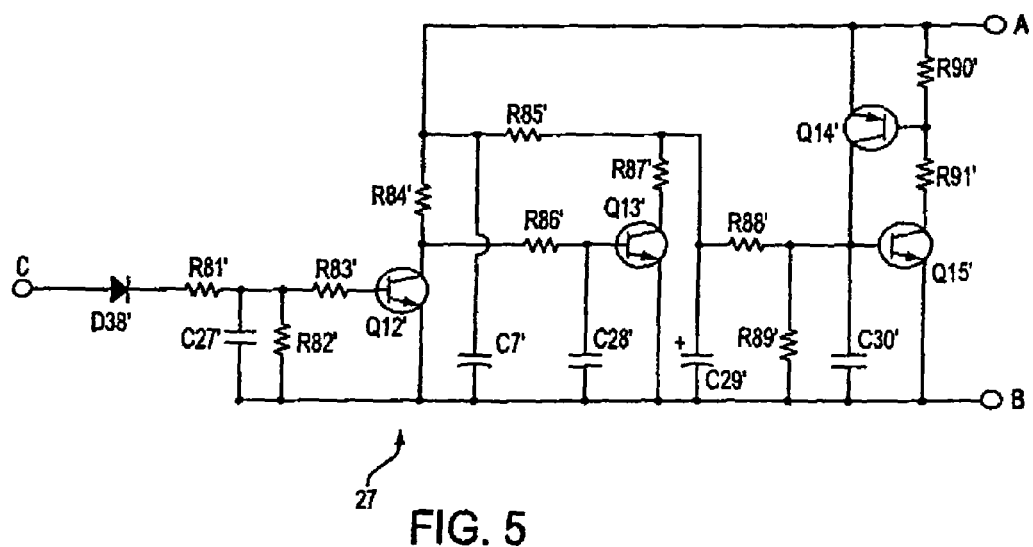
FIG. 5 is a schematic diagram of the watchdog circuit according to the invention.
Figure 6:
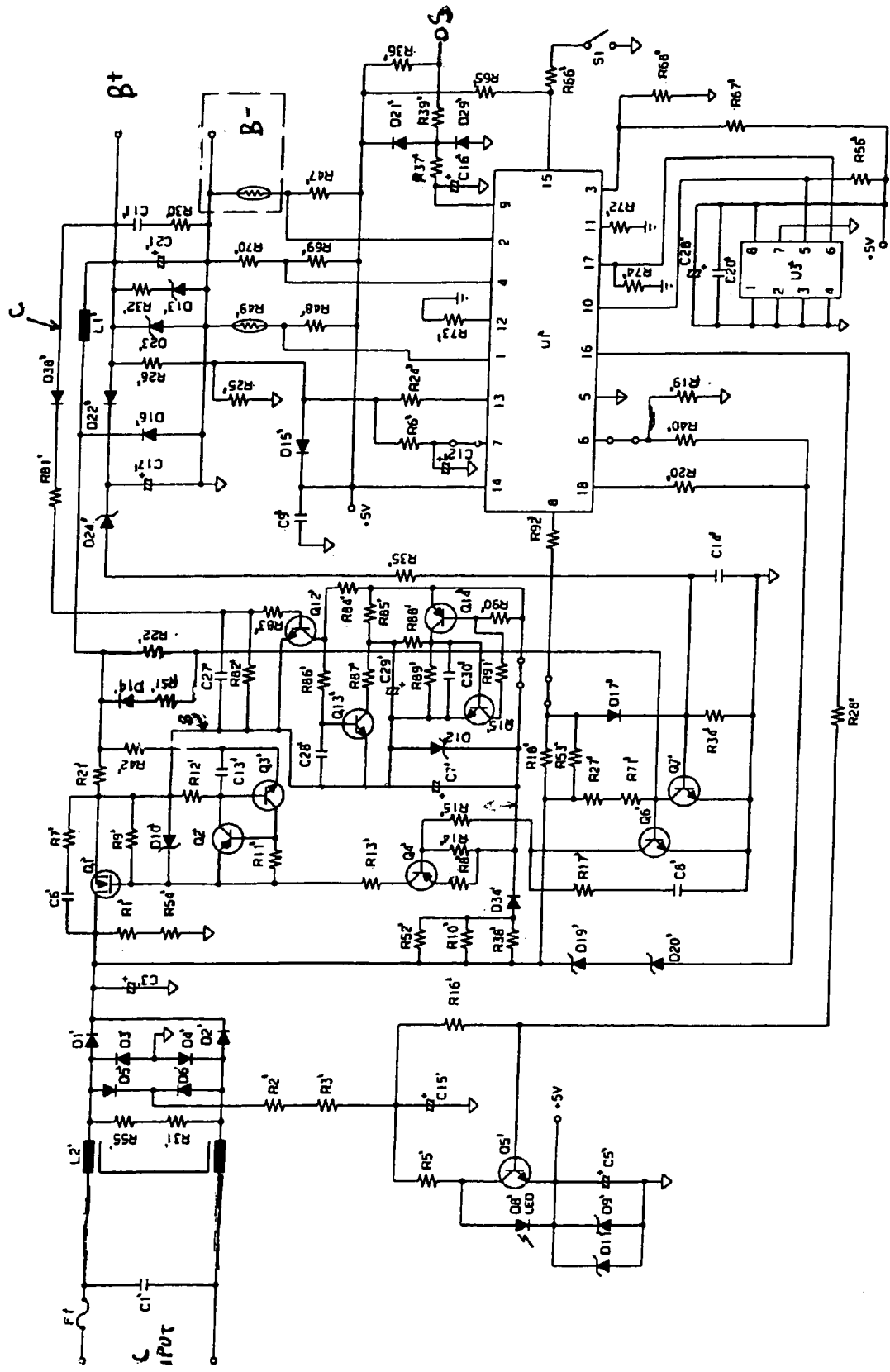
FIG. 6 is a schematic diagram of the charger including the watchdog circuit of FIG. 5.

One embodiment of watchdog 27 is shown in FIGS. 5–6. Terminal C is preferably connected to the output of current source 22 and the battery pack 10. In addition, terminal C may receive an oscillating voltage, which is preferably rectified and filtered by diode D38' and capacitor C27'. The microprocessor 23 basically superimposes a signal on the current source output by disabling the current source 22 for a predetermined period of time, e.g., 10 milliseconds once every second. The 10 ms signal allows capacitor C27' to discharge, limiting the current through transistor Q12'.

When transistor Q12' does not conduct, current preferably flows through resistors R84', R86', causing transistor Q13' to conduct. When transistor Q13' conducts, capacitor C29' is preferably discharged. The periodicity of the 10 ms signal prevents the voltage across capacitor C29' from rising to a level sufficient to trigger the latching circuit formed by transistors Q14', Q15'.

If the 10 ms signal pulse did not happen once during a period of about 2–3 seconds, the supply voltage from terminal A charges capacitor C29' through resistor R85' beyond the threshold, actuating latching circuit Q14', Q15'. When the latching circuit latches, the voltage between terminals A, B goes down to 1 volt, disabling the current source 22.

Referring to FIGS. 5–6, the values of the different components of an exemplary charger according to the invention are as follows:

| | |
|---|---|
| C1' | 0.22 microfarads, 10%, 400 VDC |
| C3' | 100 microfarads, 250 V |
| C5' | 100 microfarads, 10 V, 20%, |
| C6' | 1000 picofarads, 1 KV, 20% |
| C7' | 1 microfarad, 35 V, 20% |
| C8' | 1000 picofarads, 1 KV, 20% |
| C9' | 0.1 microfarad, 50 V, 10% |
| C12' | 1 microfarad, 35 V, 20% |
| C13' | 100 picofarads, 50 V, 10% |
| C14' | 1000 picofarads, 50 V, 10% |
| C15' | 22 microfarads, 35 V, 20% |
| C16' | 1 microfarad, 35 V, 20% |
| C17' | 10 microfarads, 100 V |
| C27' | 0.1 microfarad, 50 V, 10% |
| C28' | 0.01 microfarads, 50 V, 10% |
| C29' | 100 microfarads, 50 V, 20% |
| C30' | 0.1 microfarad, 50 V, 10% |
| D1' | 1N4006 |
| D2' | 1N4006 |
| D3' | 1N4006 |
| D4' | 1N4006 |
| D5' | 1N4006 |
| D6' | 1N4006 |
| D8' | (LED) RED |
| D9' | 5.1 V, 5%, ½ W, SMT |
| D10' | 18 V, 5PCT, ½ W, SMT |
| D12' | 1N5248B |
| D14' | 1N4937 |
| D15' | 1N4148 |
| D16' | 4 A, 600 V, UFR (MUR460) |
| D17' | 1N4148 |
| D19' | 1N5267B |
| D21' | 75 V, SMT (1N4148W) |
| D22' | 1N4006 |
| D23' | 51 V, .5 W, LEADED (P6KE51A) |
| D24' | 1N5257B |
| D29' | 75 V, SMT (1N4148W) |
| D34' | 1N4937 |
| D38' | 1N4937 |
| F1' | 2 amps, 250 V |
| L1' | 100 microhenries |
| L2' | 4.3 millihenries LFU1005V03 |
| Q1' | IRF644 |
| Q2' | 2N3906 |
| Q3' | 2N3904 |
| Q4' | 2N3906 |
| Q5' | 2N3904 |
| Q6' | 2N5551 |
| Q7' | 2N3904 |
| Q12' | 2N3904 |
| Q13' | 2N3904 |
| Q14' | 2N3906 |
| Q15' | 2N3904 |
| R1' | 150 kiloohms |
| R2' | 7.5 kiloohms |
| R3' | 7.5 kiloohms |
| R5' | 1 kiloohms |
| R6' | 39 kiloohms |
| R7' | 10 ohms |
| R8' | 200 ohms |
| R9' | 2.2 kiloohms |
| R11' | 510 ohms |
| R12' | 100 ohms |
| R13' | 100 ohms |
| R14' | 2.7 kiloohms |
| R15' | 47 kiloohms |
| R16' | 36 kiloohms |
| R17' | 47 kiloohms |
| R18' | 300 kiloohms |
| R19' | 4.02 kiloohms |
| R20' | 620 kiloohms |
| R21' | 0.11 ohms |
| R22' | 100 kiloohms |
| R24' | 47.5 kiloohms |
| R25' | 14 kiloohms |
| R26' | 80.6 kiloohms |
| R27' | 240 kiloohms |
| R28' | 7.5 kiloohms |
| R31' | 240 kiloohms |

-continued

| | |
|---|---|
| R34' | 5.1 kiloohms |
| R35' | 33 kiloohms |
| R36' | 8.25 kiloohms |
| R37' | 10 kiloohms |
| R38' | 33 kiloohms |
| R39' | 8.2 kiloohms |
| R40' | 158 kiloohms |
| R42' | 2.4 ohms |
| R47' | 82 kiloohms |
| R48' | 82 kiloohms |
| R49' | 100 kiloohms (NTC thermistor) |
| R51' | 1 kiloohms |
| R52' | 33 kiloohms |
| R53' | 360 kiloohms |
| R54' | 120 kiloohms |
| R55' | 240 kiloohms |
| R65' | 100 kiloohms |
| R68' | 10 kiloohms |
| R70' | 100 kiloohms |
| R71' | 270 kiloohms |
| R81' | 24 kiloohms |
| R82' | 10 kiloohms |
| R83' | 10 kiloohms |
| R84' | 10 kiloohms |
| R85' | 51 kiloohms |
| R86' | 5.1 kiloohms |
| R87' | 47 ohms |
| R88' | 470 kiloohms |
| R89' | 47 kiloohms |
| R90' | 510 ohms |
| R91' | 240 ohms |
| R92' | 100 ohms |
| U1' | PIC16C717 from Microchip Technologies |

Figure 7:
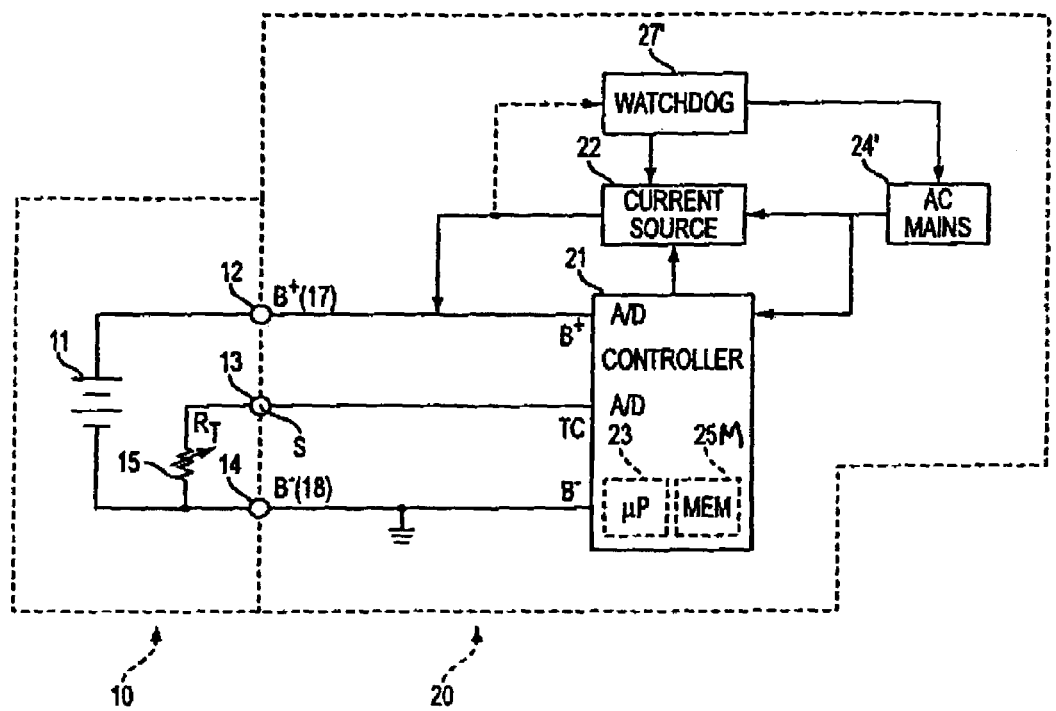
FIG. 7 is a simplified block diagram of another alternate charmer.
Figure 8:
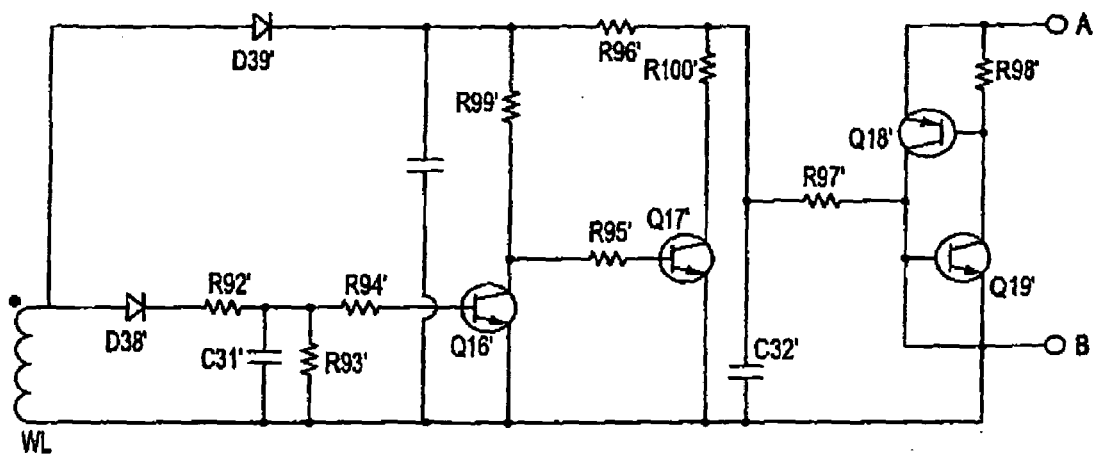
FIG. 8 is a schematic diagram of an alternate watchdog circuit according to the invention.

Persons skilled in the art will recognize that the sensing terminal, i.e., terminal C, of watchdog circuit 27 is hardwired onto the output of current source 22. However, this need not be so. Referring to FIGS. 7–8, watchdog circuit 27' is preferably inductively connected to the output of current source 22.

Preferably, a wire loop WL is used to detect, by means of magnetic induction, the presence of a periodic signal superimposed by controller 21 (or microprocessor 23) upon the output of current source 22. The detected superimposed periodic signal is demodulated by watchdog circuit 27'. Like before, the microprocessor 23 basically superimposes a signal on the current source output by disabling the current source 22 for 10 milliseconds once every second.

Watchdog circuit 27' preferably has several loops of wire forming wire loop WL. The loops are placed around or in proximity to the main inductor (not shown) of current source 22. The flux linkage between wire loop WL and the main inductor imposes a voltage across wire loop WL. Voltage across wire loop WL in turn forces current to flow through diodes D38', D39'. Current through diode D38' in turn excites the filter network formed by resistors R92', R93' and capacitor C31'.

As current flows, capacitor C31' is charged, promoting current flow through resistor R94' and causing transistor Q16' to conduct. In other words, detection of the 10 ms signal preferably excites the filter by charging capacitor C31', promoting current flow through resistor R94' and causing transistor Q16' to conduct.

When transistor Q16' conducts, current through resistor R95' is preferably limited, thus preventing transistor Q17' from conducting. When transistor Q17' does not conduct, current through diode D39' is allowed to charge capacitor C32' with a time constant effectively programmed by resistor R96'. If the voltage across capacitor C32' rises to a sufficient level, then the latching circuit formed by resistors R97', R98', and transistors Q18', Q19' is triggered. Such latching circuit can be used to short (and preferably disable) the current source 22.

When the current source 22 is disabled for 10 ms, no voltage is created through wire loop WL. Because no current then flows through diodes D38', D39', capacitor C31' can discharge. The discharge of capacitor C1 in effect limits the current through resistor R94' and transistor Q16', preventing transistor Q16' from conducting.

When transistor Q16' does not conduct, current flows through resistors R99', R95', thus causing transistor Q17' to conduct. When transistor Q17' conducts, capacitor C32' preferably discharges with a time constant effectively programmed by resistor R100'. However, the periodicity of the 10 ms signal prevents the voltage across capacitor C32' from rising to a level sufficient to trigger the latching circuit formed by resistors R97', R98', and transistors Q18', Q19'.

Persons skilled in the art will recognize that the watchdog circuits 27, 27' are preferably not connected to the low reference voltage, i.e., ground, in chargers. This obviates the need for expensive high voltage parts, such as high voltage resistors and switches, to handle 120–150 volts.

Finally, persons skilled in the art may recognize other additions or alternatives to the means disclosed herein. However, all these additions and/or alterations are considered to be equivalents of the present invention.

What is claimed is:

1. A charger for charging a battery pack, the charger comprising:
   a battery power source providing power to the battery pack, the battery power source having first and second power settings at which power is provided to the battery pack at a first and second power levels corresponding to the first and second power settings;
   a controller connected to and controlling the battery power source;
   a power supply connectable to an outside power source, the power supply receiving a current and voltage from the outside power source for providing power to at least one of the controller and the battery power source; and
   a foldback circuit for switching between the first and second power settings depending upon a magnitude of at least one of the current and voltage received from the outside power source.

2. The charger of claim 1, wherein the outside power source is a vehicle battery.

3. The charger of claim 1, wherein the foldback circuit monitors voltage of the battery pack.

4. The charger of claim 1, wherein the first and second power settings are high and low output current settings, respectively.

5. The charger of claim 4, wherein the foldback circuit switches between the first and second power settings before the current from the outside power source reaches a certain threshold.

* * * * *